United States Patent
Chliwnyj et al.

(10) Patent No.: US 7,623,318 B1
(45) Date of Patent: Nov. 24, 2009

(54) NOISE REDUCTION IN SAME-GAP SERVO IN FREQUENCY-BASED SERVO TAPE SYSTEMS

(75) Inventors: Alex Chliwnyj, Tucson, AZ (US); David L. Swanson, Tucson, AZ (US); Steven C. Wills, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/142,190

(22) Filed: Jun. 19, 2008

(51) Int. Cl.
*G11B 5/584* (2006.01)

(52) U.S. Cl. .................................. 360/77.12

(58) Field of Classification Search ........................ None
See application file for complete search history.

(56) References Cited

U.S. PATENT DOCUMENTS

| | | | |
|---|---|---|---|
| 5,309,299 A * | 5/1994 | Crossland et al. | 360/77.12 |
| 5,946,159 A | 8/1999 | Chliwnyj et al. | |
| 5,982,711 A * | 11/1999 | Knowles et al. | 360/77.12 |
| 6,671,111 B2 | 12/2003 | Ottesen et al. | |
| 6,674,590 B2 | 1/2004 | Ottesen et al. | |
| 6,831,806 B2 * | 12/2004 | Chliwnyj et al. | 360/77.12 |
| 6,833,973 B2 | 12/2004 | Chliwnyj et al. | |
| 6,839,197 B2 | 1/2005 | Chliwnyj et al. | |
| 6,865,052 B2 | 3/2005 | Chliwnyj et al | |
| 6,937,425 B2 * | 8/2005 | Knowles et al. | 360/77.12 |
| 6,943,979 B2 * | 9/2005 | Goker et al. | 360/77.12 |
| 7,299,146 B2 | 11/2007 | Chliwnyj | |
| 7,342,738 B1 * | 3/2008 | Anderson et al. | 360/77.12 |
| 7,379,254 B2 * | 5/2008 | Langlois et al. | 360/77.12 |
| 7,436,621 B2 * | 10/2008 | Goker et al. | 360/77.12 |
| 2005/0111131 A1 | 5/2005 | Anderson et al. | |
| 2005/0134995 A1 | 6/2005 | Chliwnyj | |
| 2007/0230033 A1 * | 10/2007 | McAllister et al. | 360/77.12 |

* cited by examiner

*Primary Examiner*—Hoa T Nguyen
*Assistant Examiner*—James L Habermehl
(74) *Attorney, Agent, or Firm*—Dan Shifrin

(57) ABSTRACT

Noise in a same-gap, frequency-based servo tape system is reduced by applying correlated noise factors, generated during calibration, to filtered data write signals. The resulting noise values are subtracted from filtered servo signals, at frequencies F1 and F2, to generate first and second noise-compensated servo signals at frequencies F1 and F2. In one embodiment, the F1 and F2 data signals are filtered through two SOBP filters which output the magnitudes of the signals. The F1 and F2 servo signals are similarly filtered. In another embodiment, the F1 and F2 data signals are filtered through two Goertzel filters which output the real and imaginary components of the signals and the F1 and F2 servo signals are similarly filtered through two other Goertzel filters. Correlated noise factors are applied to the outputs of the write data Goertzel filters and the results subtracted from the corresponding outputs of the servo Goertzel filters.

22 Claims, 11 Drawing Sheets

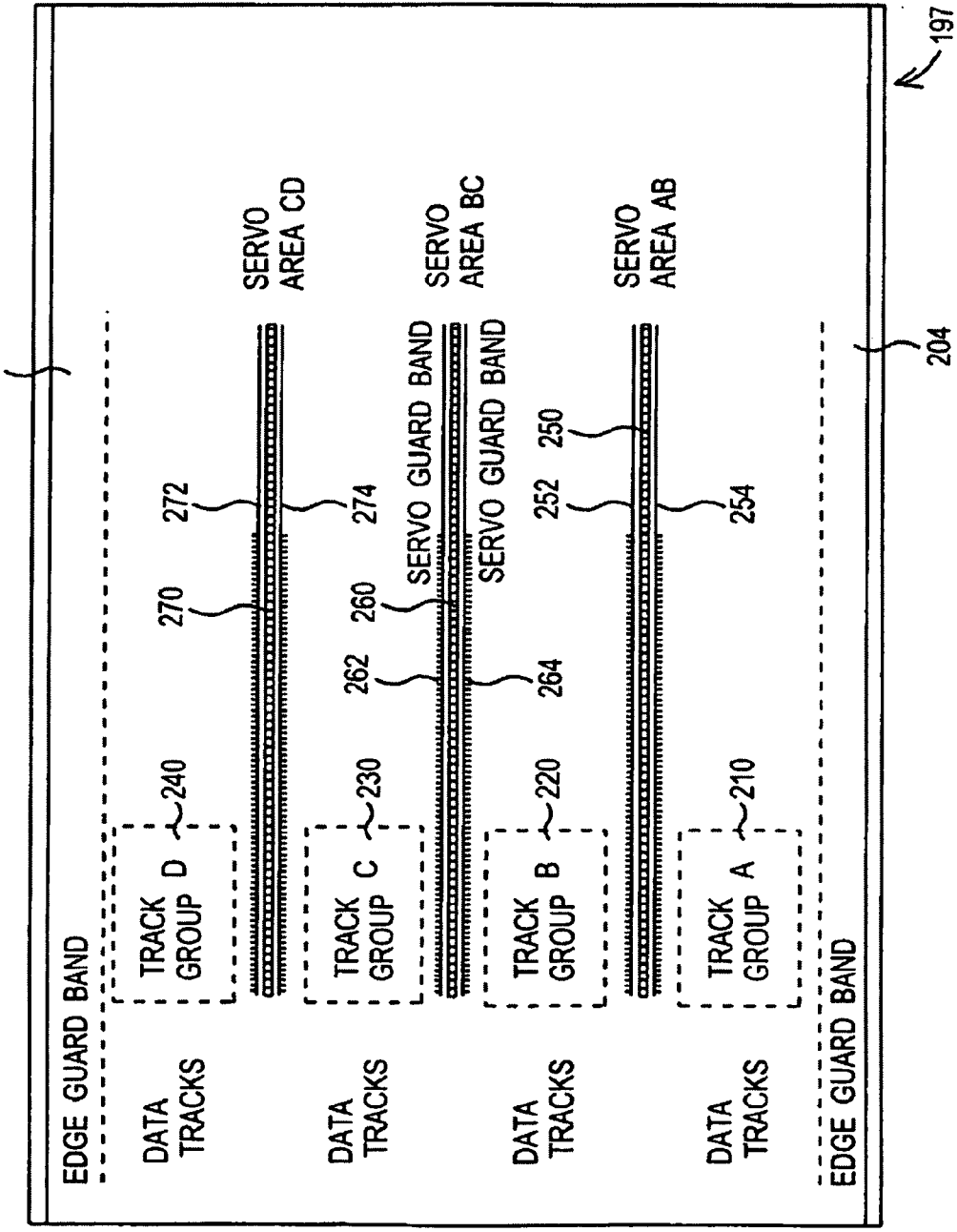

FIG. 2B

| HEAD TRACK NO. | HEAD MODULE L | HEAD MODULE R | | |
|---|---|---|---|---|
| 1 | WR | RD | | |
| 2 | RD | WR | | |
| 3 | WR | RD | | |
| 4 | RD | WR | | |
| 5 | WR | RD | | |
| 6 | RD | WR | | |
| 7 | WR | RD | | |
| 8 | RD | WR | 272 | |
| SERVO | LS1 | RS1 | 274 | 275 |
| SERVO | LS2 | RS2 | 278 | |
| 9 | WR | RD | 276 | |
| 10 | RD | WR | | |
| 11 | WR | RD | | |
| 12 | RD | WR | | |
| 13 | WR | RD | | |
| 14 | RD | WR | | |
| 15 | WR | RD | | |
| 16 | RD | WR | 262 | |
| SERVO | LS3 | RS3 | 264 | 265 |
| SERVO | LS4 | RS4 | 268 | |
| 17 | WR | RD | 266 | |
| 18 | RD | WR | | |
| 19 | WR | RD | | |
| 20 | RD | WR | | |
| 21 | WR | RD | | |
| 22 | RD | WR | | |
| 23 | WR | RD | | |
| 24 | RD | WR | 252 | |
| SERVO | LS5 | RS5 | 254 | 255 |
| SERVO | LS6 | RS6 | 258 | |
| 25 | WR | RD | 256 | |
| 26 | RD | WR | | |
| 27 | WR | RD | | |
| 28 | RD | WR | | |
| 29 | WR | RD | | |
| 30 | RD | WR | | |
| 31 | WR | RD | | |
| 32 | RD | WR | | |

NOISE REDUCTION IN SAME-GAP SERVO IN FREQUENCY-BASED SERVO TAPE SYSTEMS

RELATED APPLICATION DATA

The present application is related to commonly-assigned U.S. Pat. No. 6,865,052, entitled APPARATUS AND METHOD TO CALIBRATE SERVO SENSORS IN A NOISY ENVIRONMENT and issued Mar. 8, 2005, U.S. Pat. No. 7,299,146, entitled APPARATUS AND METHOD TO CALIBRATE A SYSTEM HAVING AN INPUT SIGNAL AND AN OUTPUT SIGNAL and issued Nov. 20, 2007, and U.S. Pat. No. 5,946,159 entitled SERVO EDGE CORRECTION USING EDGE SAMPLES TAKEN BY INDEPENDENTLY POSITIONED SERVO ELEMENTS and issued Aug. 31, 1999, which patents are incorporated herein by reference in their entireties.

TECHNICAL FIELD

The present invention relates generally to data storage tape drives and, in particular, to reducing noise in frequency-based, same-gap servos in data storage tape drives.

BACKGROUND ART

Magnetic tape data storage typically provides one or more prerecorded servo tracks to allow precise positioning of a tape head with respect to those prerecorded servo tracks. Servo elements or sensors disposed on the tape head are used to track the recorded servo tracks. The tape head comprises one or more read/write elements precisely positioned with respect to those servo sensors. One example of a magnetic tape system is the IBM 3590, which employs magnetic tape having prerecorded servo patterns that include three parallel sets of servo edges, each servo edge being an interface between two dissimilar recorded servo signals, each set of servo edges comprising one servo edge on each of opposite lateral sides of a middle recorded servo signal.

In certain embodiments, the tape head includes a plurality of servo sensors for each servo edge, with the result that the tape head may be stepped between those servo sensors, each positioning the read/write elements laterally at different interleaved groups of data tracks. Typically, for a given servo pattern of a set of two servo edges, the outer servo signals are recorded first and the center servo signal is recorded last to provide the servo edges. The nominal separation distance between the servo edges of each set of servo edges is a certain distance, but there is variation in the magnetic separation between the servo edges, for example, due to the variation of the width of the physical write element which prerecords the servo pattern, due to variation in the magnetic characteristics of the physical write element, etc. The variation may occur between servo tracks in a single magnetic tape, and may occur between prerecording devices and therefore between magnetic tapes.

To reduce the apparent difference of the edge separation distance of the prerecorded servo tracks from nominal, the prerecording of the servo tracks is conducted at different amplitudes so as to attempt to compensate for the physical difference and provide a magnetic pattern that is closer to nominal. Thus, the difference in physical distance and the amplitude compensation may tend to offset each other with respect to the apparent distance between the servo tracks. These actions may provide an adequate signal for track following at the servo edges.

However, to increase track density, a servo sensor may be indexed to positions laterally offset from the linear servo edges to provide further interleaved groups of data tracks. The indexed positions are determined by measuring the ratio between the amplitudes of the two dissimilar recorded servo signals. Thus, when the amplitudes of the recorded servo signals are varied to compensate for physical distance variations, track following the prerecorded servo edges at the offset indexed positions becomes less precise. As the result, the data tracks may vary from the desired positions, i.e. be "squeezed" together, such that writing on one track with a write element that is subject to track misregistration (TMR) may cause a data error on the immediately adjacent data track.

The tape path of the above IBM 3590 is a guided tape path. In such a guided tape path embodiment, the magnetic tape can be moved in a first direction and an opposing second direction along a first axis, i.e. along the longitudinal axis of the tape. Movement of that tape along a second axis orthogonal to the first axis, i.e. the lateral axis of the tape, is minimized. Limiting the lateral movement of the magnetic tape results in reducing noise.

Another approach, however, is required for open channel guiding in which the magnetic tape can move laterally a distance which is substantially greater than the separation between index positions, thereby introducing substantial noise into the guiding process. The guiding signal to noise ratio thus becomes negative, with the guiding noise being far larger than the step from one ratio to another, making it difficult to gather data points with a monotonic slope to conduct a calibration of the servo ratios.

In some embodiments, the tape head comprises two head modules, typically referred to as left and right head modules, adjacent to each other and each including write, read and servo elements. To accommodate read-after-write data recording, a write element on one head module will be paired opposite a read element on the other head module. With this configuration, data which is written to the tape can be immediately read and checked for errors. If an error occurs, the data can be quickly rewritten.

In some embodiments, tracking is maintained using the servo elements on the same head module as the active read elements. Thus, if data is being recorded by the write elements on the left head module and read by the read elements on the right head module, the servo elements on the right head module is used for tracking. Such a configuration introduces certain inaccuracies due to "special filtering" caused by the distance, however small, between the two head modules. More recent embodiments have reduced the inaccuracies by using the servo elements on the same head module as the write elements, called "same-gap servoing."

Same-gap servoing, however, introduced other noise in the signals generated by the servo elements. Such noise is caused by the close proximity of the write signals transmitted to the write elements to the servo signals generated by the servo elements as they read the servo patterns from the tape. One method that has been used to overcome noise from same-gap servoing is to use a different cable and module layout to increase the separation between the write signals and the servo signals. However, redesigning the cable and module configurations is complex, expensive and does not allow the use of existing hardware components.

SUMMARY OF THE INVENTION

The present invention reduces noise in a same-gap, frequency-based servo tape system. During a servo write operation, the servo data signal transmitted to a write element is separated into first and second data signals at frequencies F1 and F2. The servo signal read from a servo element on the same head module as the write element is similarly separated into first and second servo signals at frequencies F1 and F2. The two data signals are filtered and the two servo signals are filtered. First and second correlated noise factors are applied to the two filtered data signals and the resulting noise values are subtracted from the two filtered servo signals to generate first and second noise-compensated servo signals at frequencies F1 and F2.

In one embodiment, the separated data signals are filtered through two identical second order bandpass (SOBP) filters which output the magnitudes of the signals. The separated servo signals are similarly filtered through two other identical SOBP filters.

In another embodiment, the separated data signals are filtered through two identical Goertzel filters which output the real and imaginary (magnitude and phase) components of the signals. The separated servo signals are similarly filtered through two other identical Goertzel filters. Correlated noise factors are applied to all four outputs of the two write data Goertzel filters and the results subtracted from the corresponding outputs of the two servo Goertzel filters.

BRIEF DESCRIPTION OF THE DRAWINGS

FIG. 2A is a diagrammatic illustration of a magnetic tape having three parallel sets of linear servo edges, each servo edge comprising an interface between two dissimilar recorded servo signals;

FIG. 2B is a block diagram showing one embodiment of a magnetic tape head;

DETAILED DESCRIPTION OF THE PREFERRED EMBODIMENT

The described features, structures, or characteristics of the invention may be combined in any suitable manner in one or more embodiments. In the following description, specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

In the flow charts that follow, the depicted order and labeled steps are indicative of embodiments of the presented process. Other steps and processes may be conceived that are equivalent in function, logic, or effect to one or more steps, or portions thereof, of the illustrated process. Additionally, the format and symbols employed are provided to explain the logical steps of the process and are understood not to limit the scope of the process. Although various arrow types and line types may be employed in the flow chart diagrams, they are understood not to limit the scope of the corresponding process. Additionally, the order in which a particular process occurs may or may not strictly adhere to the order of the corresponding steps shown.

Figure 1:
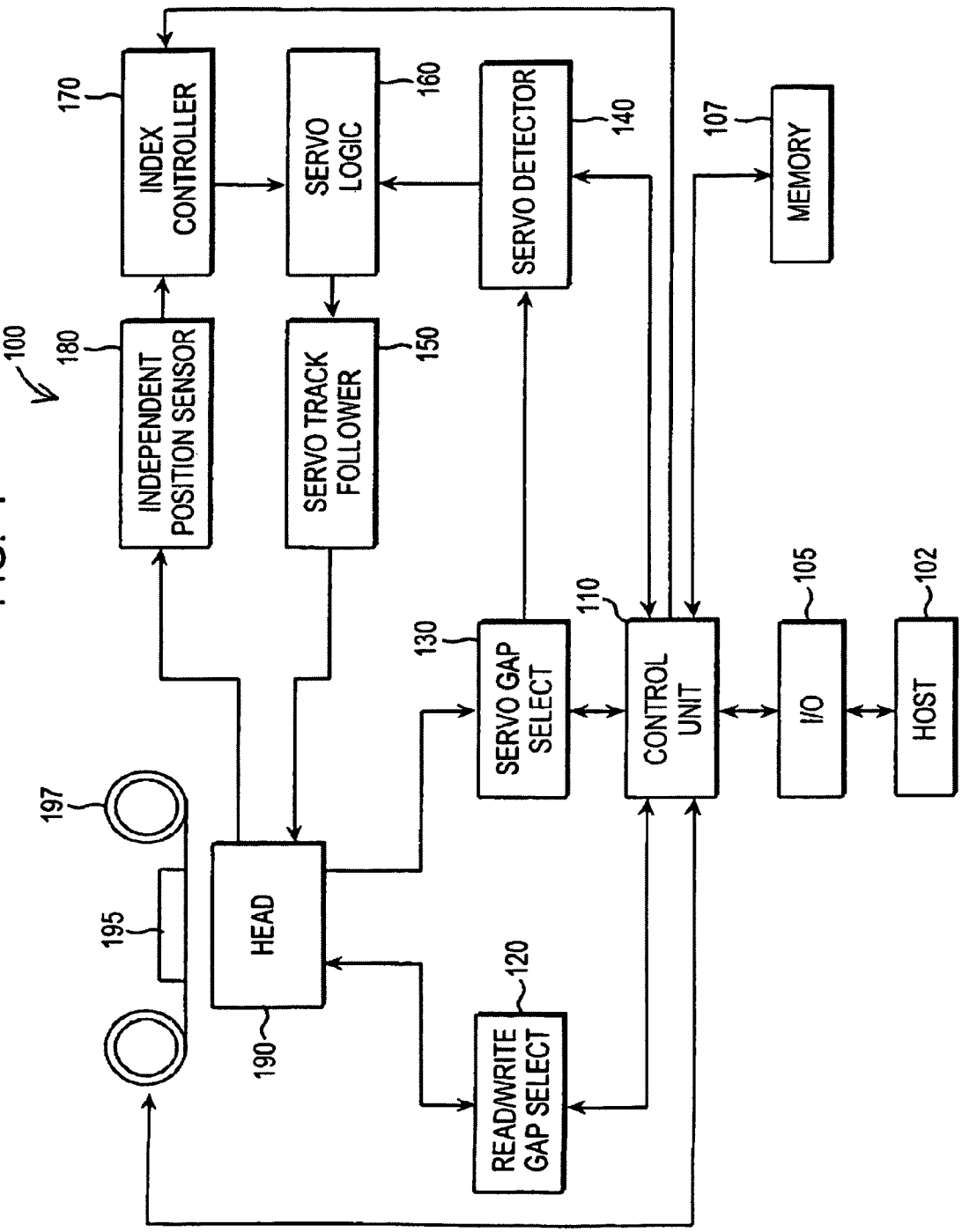
FIG. 1 is a block diagram of an embodiment of a magnetic tape system employing the present invention.

FIG. 1 shows magnetic tape data storage system 100. Control unit 110 receives and transmits data and control signals to and from a host device 102 via an interface 105. The control unit 110 is coupled to a memory device 107, such as a random access memory for storing information and computer programs. An example of a host device 102 comprises an IBM RS/6000 processor.

A multi-element tape head 190 includes a plurality of read/write elements to read and/or record information from and/or to a magnetic tape 197, and servo sensors to detect servo signals comprising prerecorded linear servo edges on the magnetic tape 197. In certain embodiments, the magnetic tape head 190 comprises a thin-film magneto-resistive transducer. In an illustrative embodiment, the tape head 190 may be constructed as shown in FIG. 2B. The length of the tape head 190 substantially corresponds to the width of the tape 197. In certain embodiments the tape head 190 includes thirty-two read/write element pairs (labeled "RD" and "WR") and three sets of servo read elements (e.g. LS1272, RS6258) corresponding to the three servo areas 250 (FIG. 2A), 260 (FIG. 2A), and 270 (FIG. 2A). In the illustrated embodiment, the thirty-two read/write element pairs are divided into groups of eight, adjacent groups being separated by two tracks occupied by a group of four servo sensors. Each group of four servo sensors may be referred to as a "servo group", e.g. servo group 255, servo group 265, and servo group 275.

In the illustrated embodiment, the tape head 190 includes left and right modules separately fabricated, then bonded together. Write and read elements alternate transversely down the length of each module (i.e., across the width of the tape), beginning with a write element in position on the left module and a read element in the corresponding position on the right module. Thus, each write element in the left module is paired with a read element in the corresponding position on the right module and each read element in the left module is paired with a write element in the corresponding position on the right module such that write/read element pairs alternate transversely with read/write element pairs.

A tape reel motor system (not shown in FIG. 1) moves the tape 197 in a first direction, and optionally in an opposing second direction, along a first axis, i.e. the longitudinal axis of the tape 197, while it is supported by a tape deck for reading and writing. In certain embodiments, the tape deck does not precisely hold the tape in position laterally. Rather in these embodiments, open channel guiding may be employed in which the magnetic tape can move laterally.

A servo track follower 150 directs the motion of the magnetic tape head 190 in a lateral or transverse direction relative to the longitudinal direction of tape motion, i.e. the tape head moves in a third and an opposing fourth direction along a second axis, where that second axis is substantially orthogonal to the first axis described above. The control unit 110 is coupled to one or more tape reel motors and controls the direction, velocity and acceleration of the tape 197 in the longitudinal direction.

The data tracks on the tape 197 are arranged in parallel and are parallel to the linear servo edges. Thus, as the servo track follower 150 causes the servo sensors of the magnetic tape head 190 to track follow a linear servo edge or a servo index position laterally offset from a servo edge, the read/write elements track a parallel group of the data tracks. If it is desired to track another parallel group of data tracks, the magnetic tape head 190 is indexed laterally to another servo edge or to another servo index position, or a different servo sensor is aligned with the same or a different servo edge or servo index position.

When the magnetic tape head 190 is to be moved to a selected index position, an index controller 170 is enabled by the control unit 110, receiving a lateral position signal from an independent position sensor 180 and transmits an appropriate signal to servo logic 160 to select the appropriate servo track, while the control unit 110 transmits an appropriate signal to a servo gap selector 130 to select the appropriate servo sensor. The independent position sensor 180 is discussed in the aforementioned U.S. Pat. No. 5,946,159 in which it is called a non-servo position sensor, and indicates the lateral mechanical position of the tape head 190 with respect to the tape path 195.

The tape system 100 may be bidirectional, in which ones of the read/write elements are selected for one direction of longitudinal tape movement, and others of the read/write elements are selected for the opposite direction of movement. The control unit 110 additionally selects the appropriate ones of the read/write elements by transmitting a signal to a read/write gap select unit 120.

Once a servo edge or edges are selected, the servo gap selector 130 provides the servo signals to a servo detector 140, which information is employed by servo logic 160 to position the tape head 190 to track follow the detected edges. In accordance with the present invention, servo logic 160 employs the servo information sensed by the servo detector 140 and the mechanical positioning information from the independent position sensor 180 to calibrate the track following servo. The track following servo logic is also implemented in the servo logic 160 employing the sensed servo signals to determine the ratios of the sensed servo signals, which are employed in accordance with the present invention to track a designated servo index position.

Referring to FIG. 2A, a plurality, for example three, parallel sets of linear servo edges 250, 260 and 270 are illustrated, each servo edge comprising an interface between two dissimilar recorded servo signals, each set of servo edges comprising one of the servo edges on each of opposite lateral sides of a middle recorded servo signal. As an example, a corresponding plurality of laterally offset servo sensors, i.e. servo sensor groups 255, 265, 275 (FIG. 2B), are disposed on the tape head 190 to sense the servo signals at each corresponding edge. Additional pluralities of servo sensors, i.e. sensors 272, 274, 276, 278, may be provided to allow positioning of the tape head at additional data tracks.

Figure 3A:
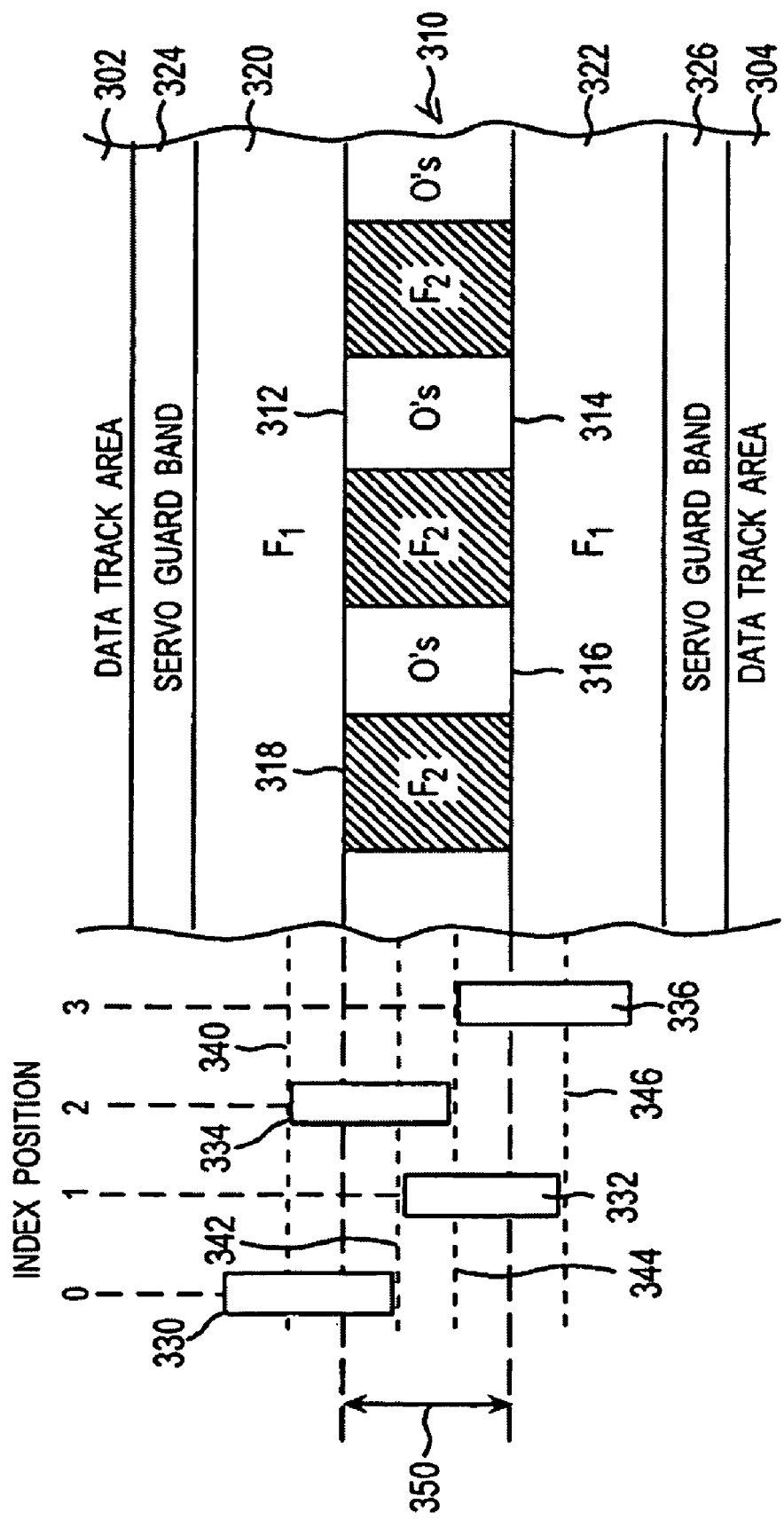
FIG. 3A is a detailed diagrammatic representation of a magnetic tape format providing four servo index positions in one set of two linear servo edges of the magnetic tape of FIG. 2A.
Figure 3B:
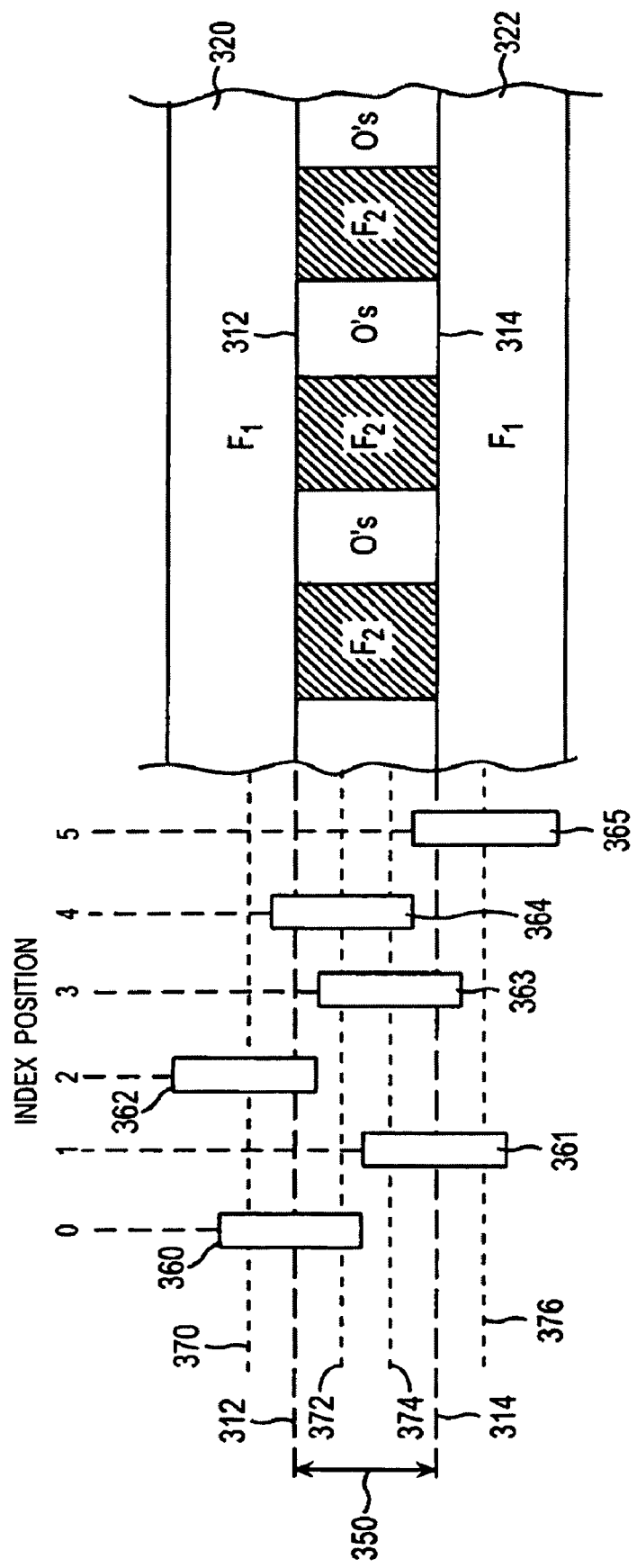
FIG. 3B is a detailed diagrammatic representation of a magnetic tape format providing six servo index positions in one set of two linear servo edges of the magnetic tape of FIG. 2A.

Referring to FIG. 3A, the typical magnetic tape format of servo signals to form linear servo edges 312 and 314 comprising an interface between two dissimilar recorded servo signals is illustrated. One set of servo edges comprises outer bands 320 and 322, having a recorded pattern of a constant amplitude signal of a single first frequency, on either side of an inner band 310 of the other servo signal, having a recorded pattern alternating between a constant amplitude burst signal 318 of a single second frequency and a zero amplitude null signal 316. Typically, the servo signals 320, 310 and 322 are provided with servo guard bands 324 and 326 to protect the outer bands 320 and 322 from noise resulting from the data track areas 302 and 304.

To reduce the apparent difference of the edge separation 350 distance of the prerecorded servo tracks from nominal, the prerecording of the servo signals is conducted at different amplitudes so as to attempt to compensate for the physical difference and provide a magnetic pattern that is closer to nominal. Additionally, three servo sensors are employed to simultaneously sense the three servo tracks. Thus, the difference in physical distance and the amplitude compensation may tend to offset each other with respect to the resultant apparent distance between the servo tracks. These actions may provide an adequate signal for track following at the servo edges.

However, to increase data track density, in the embodiment of FIG. 3A four servo index positions, i.e. index positions 0, 1, 2, and 3, are calibrated. These index positions are laterally offset with respect to the sensed servo edges of the set of linear servo edges. Index position 0 corresponds to sensor position 330 over tape track position 340. Similarly, the index positions 1, 2, and 3, respectively, correspond to the sensors' positions 332, 334, and 336, respectively, over the tape track positions 342, 344, and 346, respectively. The relative positions of these four index positions are: 0, 2, 1, 3.

As an example, the servo index positions may be offset laterally about one quarter the width of the inner band 310 away from the servo edge in either direction, providing four index positions. The servo sensors are substantially the same sensing width as the predetermined distance 350. The indexed positions are determined by measuring the ratio between the amplitudes of the two dissimilar recorded servo signals, e.g., as measured by the servo detector 140 of FIG. 1. The servo logic 160 operates the servo track follower 150 to track follow at the desired measured ratio. For example, the measured ratio will be the ratio between the sum of the sensed outer band signal 320 plus the inner band signal 318, and the sensed outer band signal 320, giving effect to the null 316. The illustrations and descriptions herein employ this ratio.

To track follow an edge or edges, once a servo edge or edges are selected, the servo gap selector 130 of FIG. 1 provides the servo signals to a servo detector 140, which digitally detects the servo signals at a predetermined sample rate, and provides servo signal ratios of each of the selected servo sensors. The servo logic 160 employs the servo signal ratios to determine the displacement from the edges and operates the servo track follower 150 to position the tape head 190 to track follow at the desired displacement from the edges.

Figure 4:
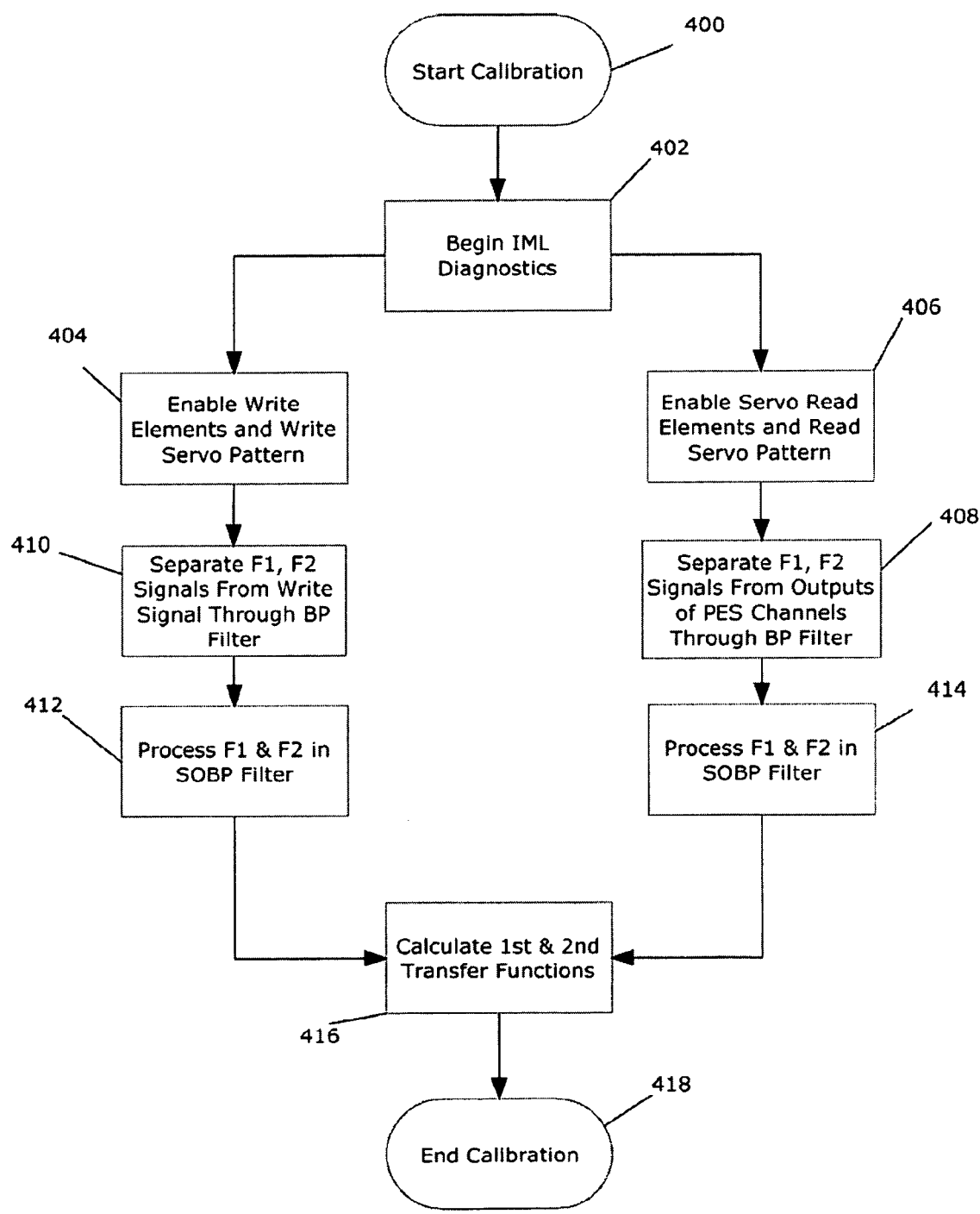
FIG. 4 is a flow chart of a calibration operation according to a first embodiment of the present invention.

FIG. 4 is a flow chart of a calibration operation 400 according to a first embodiment of the present invention. During the initial microcode load (IML) (step 402), the appropriate data write elements are enabled and data is sent to the write elements that replicate the servo pattern frequencies, F1 and F2 (step 404). At the same time, the appropriate servo read elements are enabled (step 406). Outputs of the position error signal channels are fed through a bandpass filter, such as a 17 tap bandpass filter, to separate the F1 and F2 signals (step 408). The digital write equalized signals to the write elements in the same gap (head module) are fed through an identical filter (step 410). The resulting sets of signals from both bandpass filters are processed through identical second-order bandpass (SOBP) filters (steps 412, 414). The outputs from the four filters are:

a) the magnitude of the F1 of the data write pattern;
b) the magnitude of the F1 feed through to the servo channel;

c) the magnitude of the F2 of the data write pattern; and d) the magnitude of the F2 feed through to the servo channel.

From these four values, two magnitude transfer functions may be determined (step 416):

i) (F1 feed through to the servo channel)/(F1 of the data write pattern); and ii) (F2 feed through to the servo channel)/(F2 of the data write pattern).

Calibration is then complete (step 418).

Figure 5:
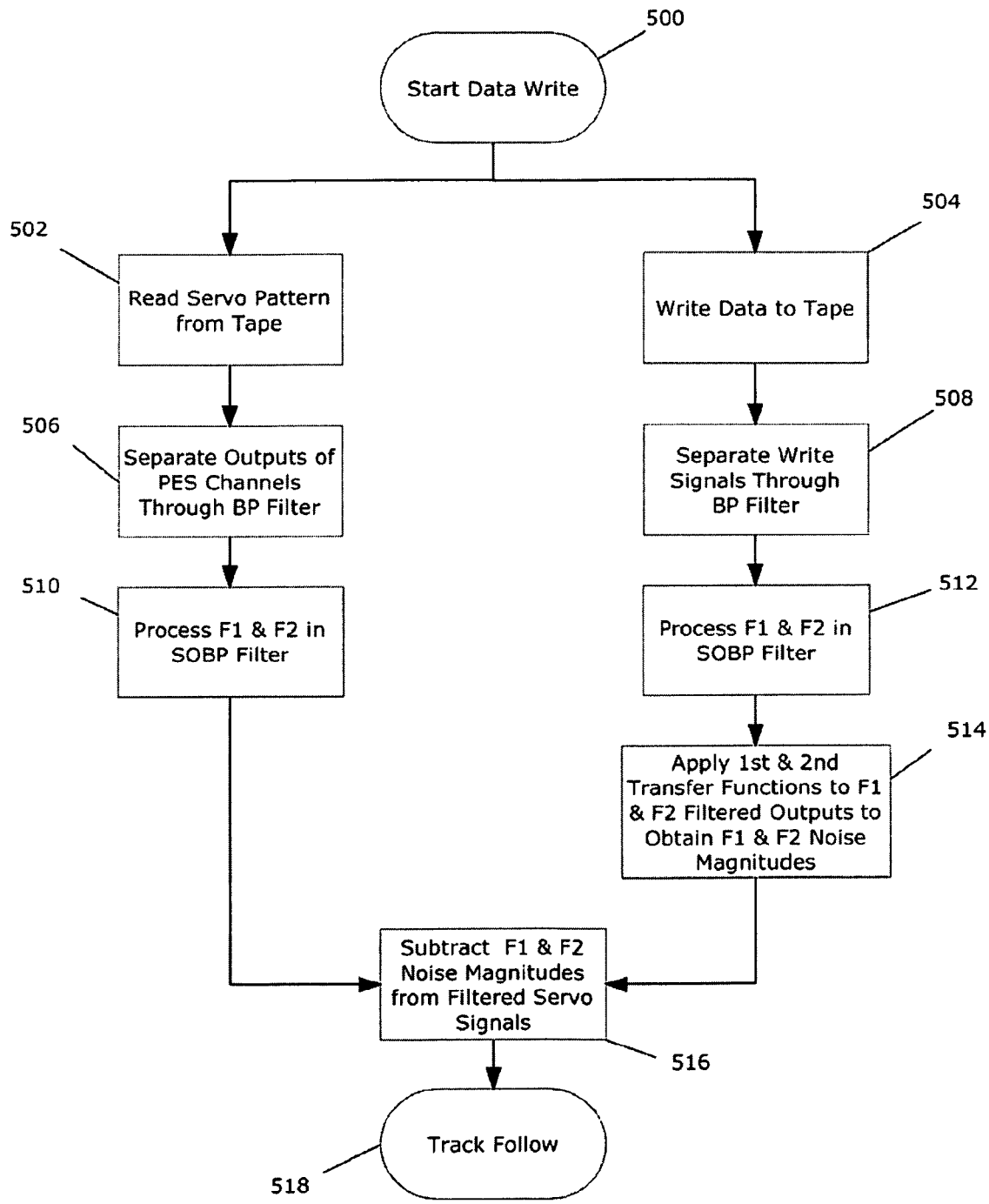
FIG. 5 is a flow chart of a data write operation according to the first embodiment of the present invention.
Figure 6:
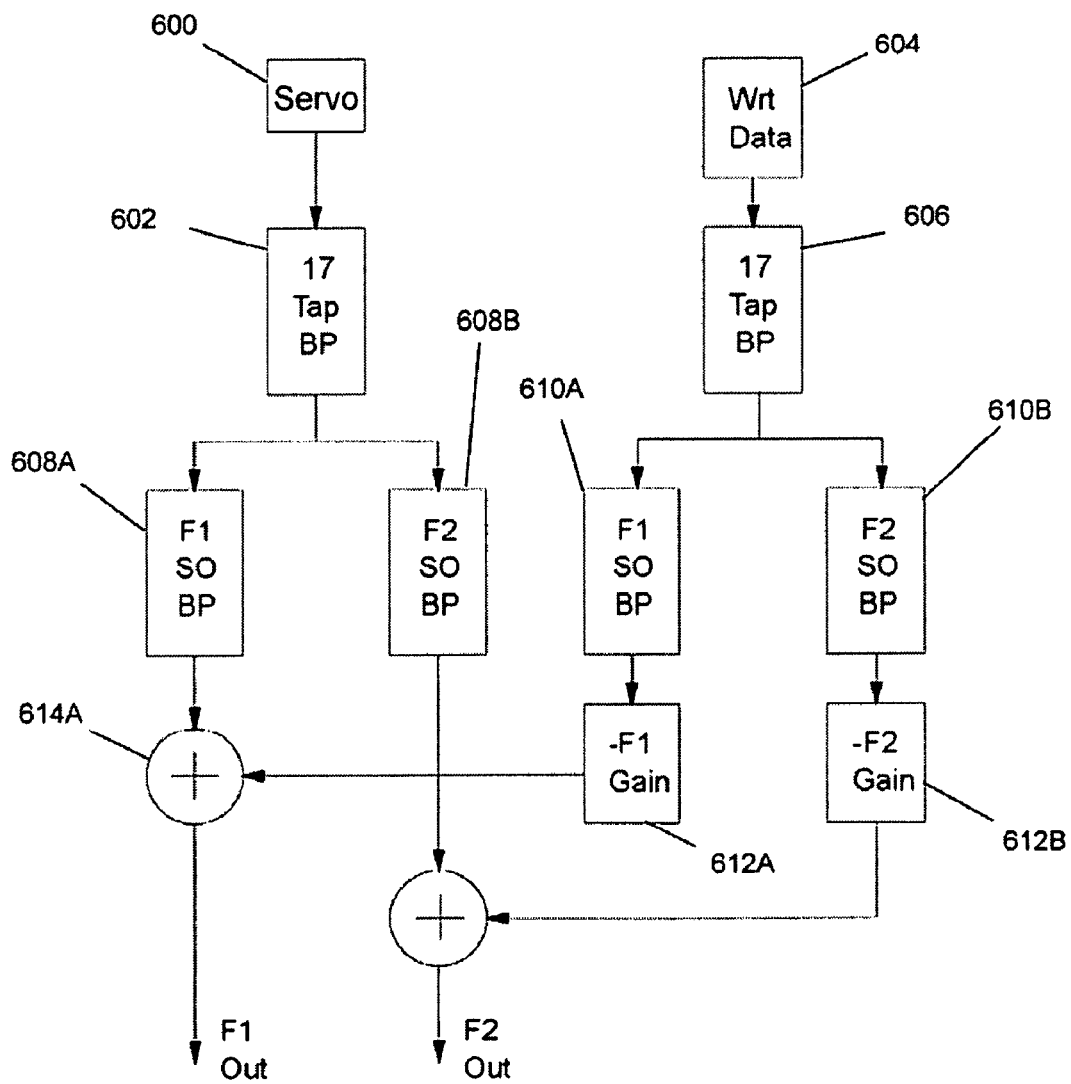
FIG. 6 is a logic diagram of the data write operation according to the first embodiment of the present invention.

Turning now to the flow chart of FIG. 5 and the logic diagram of FIG. 6, a data write operation (step 500) according to the first embodiment will be described. As the tape is transported past the tape head, the servo pattern is read by the servo elements of one of the head modules (step 502) and data is transmitted to the write elements of the same head module (step 504). In a comparable process as was performed during calibration, outputs of the position error signal channels 600 are fed through a bandpass filter, such as a 17 tap bandpass filter 602, to separate the F1 and F2 signals (step 506). The sample rate of the filter 602 should preferably be the first common harmonic of both F1 and F2, which in the implementation described herein is 9.384 MHz. The write equalized signals to the write elements 604 are fed through an identical filter 606 (step 508), preferably using the write clock rate as the sampling rate. The resulting sets of signals from both bandpass filters are processed through identical sets of SOBP filters 608A, 608B and 610A, 610B, respectively (steps 510, 512). Next, the F1 and F2 transfer functions from the calibration operation are applied 612A, 612B to the two filtered write equalized signals (step 514) to obtain values of estimated noise magnitudes in the F1 and F2 write signals. These magnitudes are then subtracted 614A, 614B from the filtered servo signals (step 516) to remove a substantial amount of the noise. The resulting signals are transmitted to the track following module of the tape drive (step 518).

Figure 7:
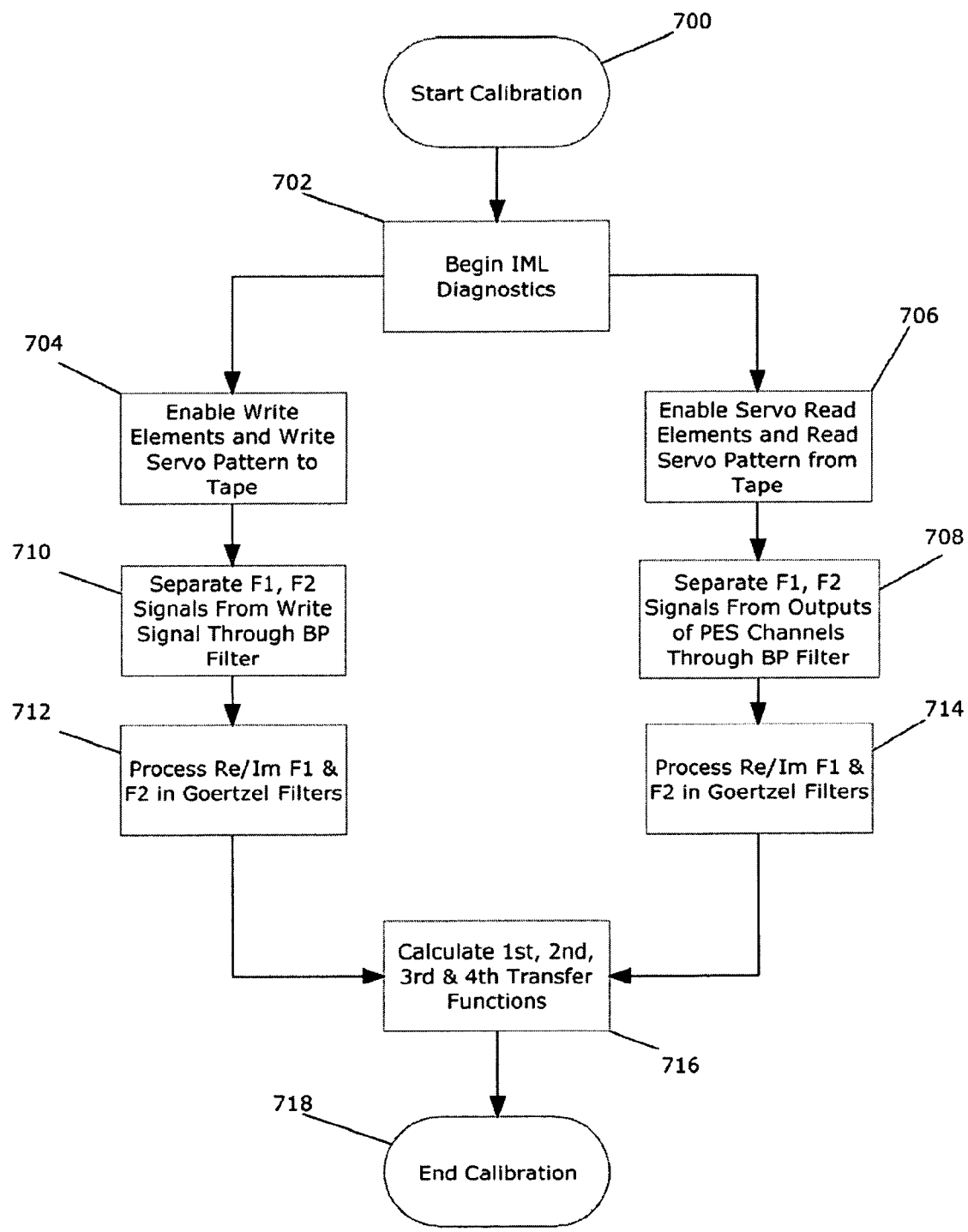
FIG. 7 is a flow chart of a calibration operation according to a second embodiment of the present invention.

FIG. 7 is a flow chart of a calibration operation 700 according to a second embodiment of the present invention. During the initial microcode load (IML) (step 702), the appropriate data write elements are enabled and data is sent to the write elements that replicate the servo pattern frequencies, F1 and F2 (step 704). At the same time, the appropriate servo read elements are enabled (step 706). Outputs of the position error signal channels, preferably PES channels 1 and 3, are fed through a bandpass filter, such as a 17 tap bandpass filter, to separate the F1 and F2 signals (step 708). The sample clock of the filter is preferably approximately 9.384 MHz and the base fundamental frequency is preferably 78 samples long. The sample rate of the filter should be the first common harmonic of both F1 and F2, which in this implementation is 9.384 MHz; and the base fundamental frequency needs to be time needs to be equal to the actual servo measurement time, which in this case is 78 samples long. The write equalized signals to the write elements in the same gap (head module) are fed through an identical filter (step 710). The sample clock of the filter is preferably the write clock and the base fundamental frequency should be equal to the above base fundamental frequency, which in the implementation described herein would be 312 samples long. The resulting sets of signals from both bandpass filters are processed through identical sets of Goertzel filters (steps 712, 714) to output real (representing magnitude) and imaginary (representing phase) values. The outputs from the four filters are:

a) the real value of the F1 of the data write pattern;

b) the imaginary value of the F1 of the data write pattern;

c) the real value of the F1 feed through to the servo channel;

d) the imaginary value of the F1 feed through to the servo channel;

e) the real value of the F2 of the data write pattern;

f) the imaginary value of the F2 of the data write pattern;

g) the real value of the F2 feed through to the servo channel; and h) the imaginary value of the F2 feed through to the servo channel.

From these eight values, four transfer functions may be determined (step 716):

i) (real F1 feed through to the servo channel)/(real F1 of the data write pattern);

ii) (imaginary F1 feed through to the servo channel)/(imaginary F1 of the data write pattern);

iii) (real F2 feed through to the servo channel)/(real F2 of the data write pattern);

iv) (imaginary F2 feed through to the servo channel)/(imaginary F2 of the data write pattern);

Calibration is then complete (step 718).

Figure 8:
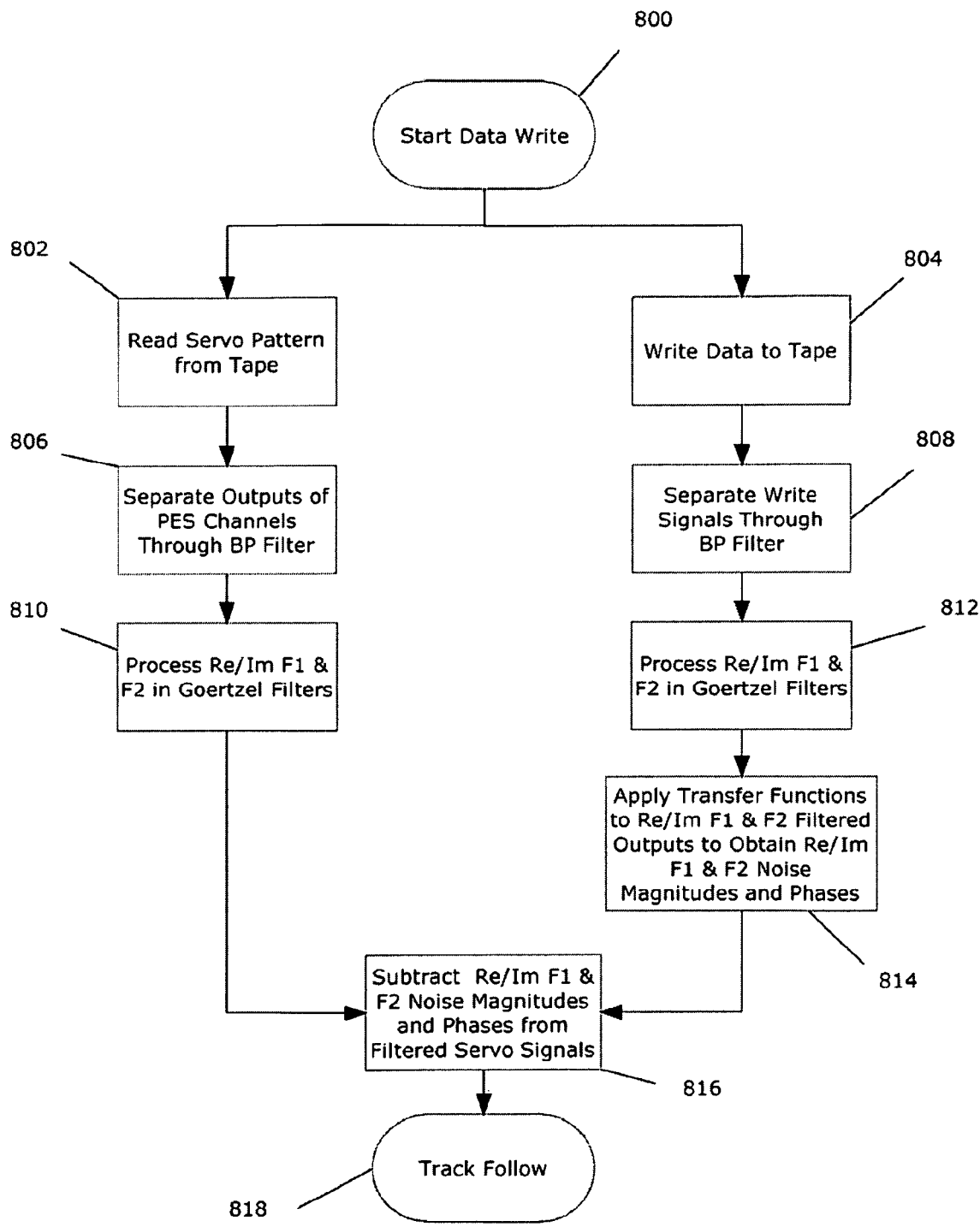
FIG. 8 is a flow chart of a data write operation according to the second embodiment of the present invention.
Figure 9:
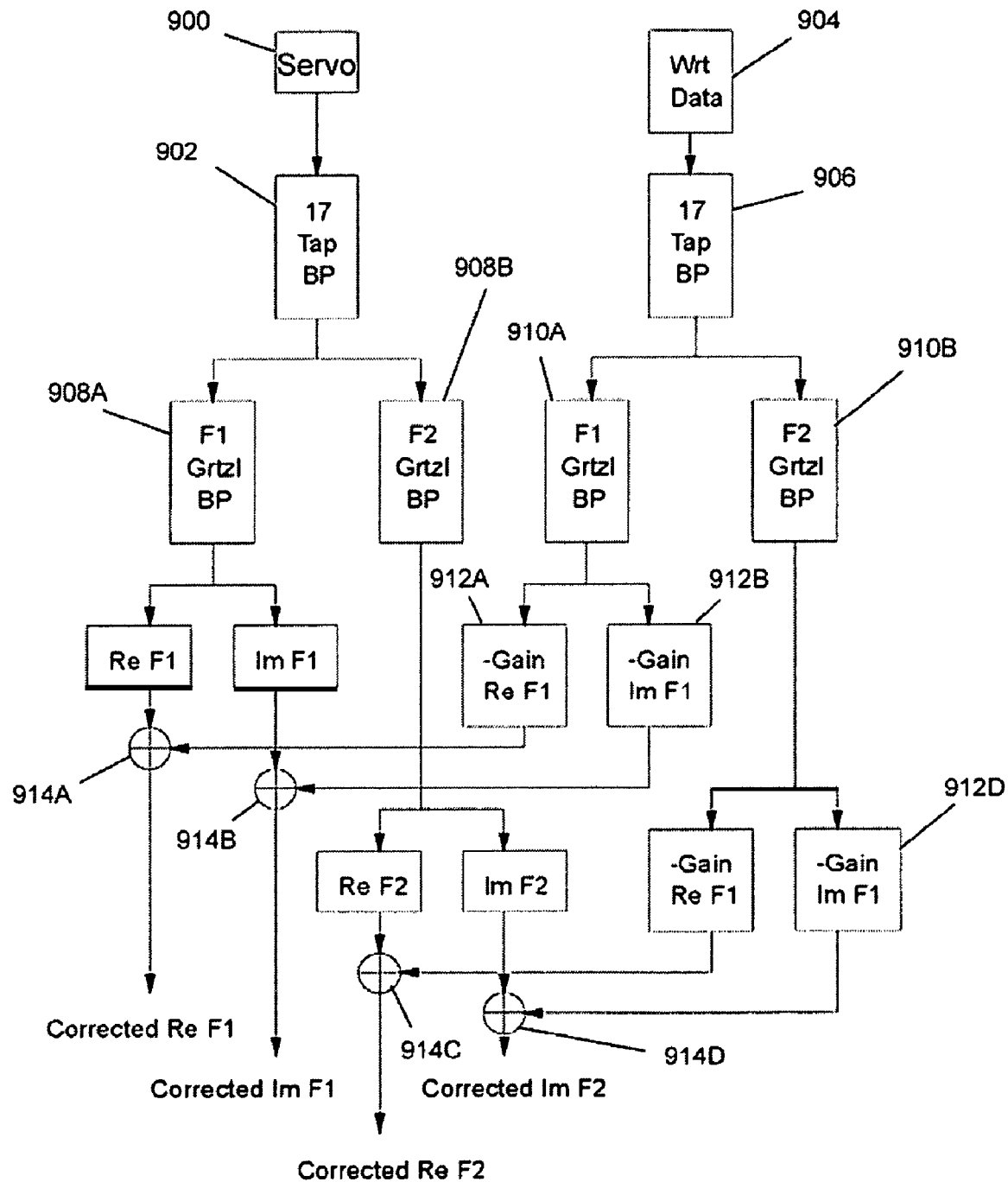
FIG. 9 is a logic diagram of the data write operation according to the second embodiment of the present invention.

Turning now to the flow chart of FIG. 8 and the logic diagram of FIG. 9, a data write operation (step 800) according to the second embodiment will be described. As the tape is transported past the tape head, the servo pattern is read by the servo elements of one of the head modules (step 802) and data is transmitted to the write elements of the same head module (step 804). In a comparable process as was performed during calibration, outputs of the position error signal channels 900 are fed through a bandpass filter, such as a 17 tap bandpass filter 902, to separate the F1 and F2 signals (step 806). The sample rate of the filter 602 should be the first common harmonic of both F1 and F2, which in the implementation described herein is 9.384 MHz. The write equalized signals to the write elements 904 are fed through an identical filter 906 (step 808), preferably using the write clock rate as the sampling rate. The resulting sets of signals from both bandpass filters are processed through identical sets of Goertzel filters 908A, 908B and 910A, 910B, respectively (steps 810, 812) resulting in real and imaginary values for each of the F1 and F2 filtered signals. Next, the F1 and F2 transfer functions from the calibration operation are applied 612A, 612B, 612C, 612D to the four filtered write equalized signals (step 814) to obtain values of estimated noise magnitudes and phases in the F1 and F2 write signals. These values are then subtracted 614A, 614B, 614C, 614D from the filtered servo signals (step 816) to remove a substantial amount of the noise. The resulting signals are transmitted to the track following module of the tape drive (step 818).

It is important to note that while the present invention has been described in the context of a fully functioning data processing system, those of ordinary skill in the art will appreciate that the processes of the present invention are capable of being distributed in the form of a computer readable storage medium of instructions and a variety of forms and that the present invention applies regardless of the particular type of signal bearing media actually used to carry out the distribution. Examples of computer readable storage media include recordable-type media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for or reducing noise in a same-gap, frequency-based servo tape system.

What is claimed is:

1. A method for reducing noise in a same-gap, frequency-based servo tape system, comprising:
   noise calibrating a same-gap, frequency-based servo tape system to generate first and second correlated noise factors;
   transporting a data tape across a tape head module, the tape head module including a write element and a servo read element;
   transmitting a data signal to the write element to be written to the tape;
   receiving a raw servo signal from the servo read element, the raw servo signal including noise from the data signal;
   separating the raw servo signal into first and second servo signals at frequencies F1 and F2, respectively;
   filtering the first and second servo signals to generate first and second filtered servo signals, respectively;
   separating the data signal into first and second data signal at frequencies F1 and F2, respectively;
   filtering the first and second data signals to generate first and second filtered data signals, respectively;
   applying the first and second correlated noise factors to the first and second filtered data signals, respectively, to generate first and second correlated noise values, respectively; and
   subtracting the first and second noise values from the first and second filtered servo signals, respectively to generate first and second noise-compensated servo signals.

2. The method of claim 1, wherein:
   separating the raw servo signal into first and second servo signals comprises processing the raw servo signal through a first multi-tap bandpass filter; and
   separating the data signal into first and second data signals comprises processing the data signal through a second multi-tap bandpass filter having the same characteristics as the first multi-tap bandpass filter.

3. The method of claim 1, wherein:
   filtering the first and second servo signals comprises processing the first and second servo signals through first and second second-order bandpass filters, respectively; and
   filtering the first and second data signals comprises processing the first and second data signals through third and fourth second-order bandpass filters, respectively, having the same characteristics as the first and second second-order bandpass filters, respectively.

4. The method of claim 3, wherein noise calibrating the same-gap, frequency-based servo tape system comprises:
   determining the first correlated noise factor as a ratio of the magnitude of the first filtered servo signal to the magnitude of the first data signal; and
   determining the second correlated noise factor as a ratio of the magnitude of the second filtered servo signal to the magnitude of the second data signal.

5. The method of claim 1, wherein:
   filtering the first and second servo signals comprises processing the first and second servo signals through first and second Goertzel bandpass filters, respectively; and
   filtering the first and second data signals comprises processing the first and second data signals through third and fourth Goertzel bandpass filters, respectively, having the same characteristics as the first and second Goertzel bandpass filters, respectively;
   wherein:
   the output of the first Goertzel bandpass filter comprises a real component and an imaginary component representing a magnitude and a phase, respectively, of the first filtered servo signal at frequency F1;
   the output of the second Goertzel bandpass filter comprises a real component and an imaginary component representing a magnitude and phase, respectively, of the second filtered servo signal at frequency F2;
   the output of the third Goertzel bandpass filter comprises a real component and an imaginary component representing a magnitude and phase, respectively, of the first filtered data signal at frequency F1; and
   the output of the fourth Goertzel bandpass filter comprises a real component and an imaginary component representing a magnitude and phase, respectively, of the second filtered data signal at frequency F2.

6. The method of claim 5, wherein noise calibrating the same-gap, frequency-based servo tape system further comprises generating third and fourth correlated noise factors.

7. The method of claim 6, wherein noise calibrating the same-gap, frequency-based servo tape system comprises:
   determining the first correlated noise factor as a ratio of the magnitude of the real component of the first filtered servo signal to the magnitude of the real component of the first data signal;
   determining the second correlated noise factor as a ratio of the phase of the imaginary component of the first filtered servo signal to the phase of the imaginary component of the first data signal;
   determining the third correlated noise factor as a ratio of the magnitude of the real component of the second filtered servo signal to the magnitude of the real component of the second data signal; and
   determining the fourth correlated noise factor as a ratio of the phase of the imaginary component of the second filtered servo signal to the phase of the imaginary component of the second data signal.

8. A computer program product of a computer readable storage medium usable with a programmable computer, the computer program product having computer-readable code embodied therein for reducing noise in a same-gap, frequency-based servo tape system, the computer-readable code comprising instructions for:
   noise calibrating a same-gap, frequency-based servo tape system to generate first and second correlated noise factors;
   transporting a data tape across a tape head module, the tape head module including a write element and a servo read element;
   transmitting a data signal to the write element to be written to the tape;
   receiving a raw servo signal from the servo read element, the raw servo signal including noise from the data signal;
   separating the raw servo signal into first and second servo signals at frequencies F1 and F2, respectively;
   filtering the first and second servo signals to generate first and second filtered servo signals, respectively;
   separating the data signal into first and second data signal at frequencies F1 and F2, respectively;
   filtering the first and second data signals to generate first and second filtered data signals, respectively;

applying the first and second correlated noise factors to the first and second filtered data signals, respectively, to generate first and second correlated noise values, respectively; and subtracting the first and second noise values from the first and second filtered servo signals, respectively to generate first and second noise-compensated servo signals.

9. The computer program product of claim 8, wherein:
the instructions for separating the raw servo signal into first and second servo signals comprise instructions for processing the raw servo signal through a first multi-tap bandpass filter; and
the instructions for separating the data signal into first and second data signals comprise instructions for processing the data signal through a second multi-tap bandpass filter having the same characteristics as the first multi-tap bandpass filter.

10. The computer program product of claim 8, wherein:
the instructions for filtering the first and second servo signals comprise instructions for processing the first and second servo signals through first and second second-order bandpass filters, respectively; and
the instructions for filtering the first and second data signals comprise instructions for processing the first and second data signals through third and fourth second-order bandpass filters, respectively, having the same characteristics as the first and second second-order bandpass filters, respectively.

11. The computer program product of claim 10 wherein the instructions for noise calibrating the same-gap, frequency-based servo tape system comprise instructions for:
determining the first correlated noise factor as a ratio of the magnitude of the first filtered servo signal to the magnitude of the first data signal; and
determining the second correlated noise factor as a ratio of the magnitude of the second filtered servo signal to the magnitude of the second data signal.

12. The computer program product of claim 8, wherein:
the instructions for filtering the first and second servo signals comprise instructions for processing the first and second servo signals through first and second Goertzel bandpass filters, respectively; and
the instructions for filtering the first and second data signals comprise instructions for processing the first and second data signals through third and fourth Goertzel bandpass filters, respectively, having the same characteristics as the first and second Goertzel bandpass filters, respectively;
wherein:
the output of the first Goertzel bandpass filter comprises a real component and an imaginary component representing a magnitude and phase, respectively, of the first filtered servo signal at frequency F1;
the output of the second Goertzel bandpass filter comprises a real component and an imaginary component representing a magnitude and phase, respectively, of the second filtered servo signal at frequency F2;
the output of the third Goertzel bandpass filter comprises a real component and an imaginary component representing a magnitude and phase, respectively, of the first filtered data signal at frequency F1; and
the output of the fourth Goertzel bandpass filter comprises a real component and an imaginary component representing a magnitude and phase, respectively, of the second filtered data signal at frequency F2.

13. The computer program product of claim 12, wherein the instructions for noise calibrating the same-gap, frequency-based servo tape system further comprise instructions for generating third and fourth correlated noise factors.

14. The computer program product of claim 13, wherein the instructions for noise calibrating the same-gap, frequency-based servo tape system comprise instructions for:
determining the first correlated noise factor as a ratio of the magnitude of the real component of the first filtered servo signal to the magnitude of the real component of the first data signal;
determining the second correlated noise factor as a ratio of the phase of the imaginary component of the first filtered servo signal to the phase of the imaginary component of the first data signal;
determining the third correlated noise factor as a ratio of the magnitude of the real component of the second filtered servo signal to the magnitude of the real component of the second data signal; and
determining the fourth correlated noise factor as a ratio of the phase of the imaginary component of the second filtered servo signal to the phase of the imaginary component of the second data signal.

15. A same-gap, frequency-based servo tape system for reading/writing data from/to a magnetic tape, the tape having a plurality of laterally spaced data tracks extending longitudinally along the length of the tape and further having at least one servo track extending longitudinally along the length of the tape and positioned laterally between two data tracks, the servo track having a first servo signal recorded at a first frequency F1 on two outer servo bands and a recorded second servo signal at a second frequency F2 on an inner servo band, the tape drive comprising:
a motion system capable of moving the magnetic tape longitudinally along a tape path in a first direction and an opposing second direction;
a tape head capable of moving laterally relative to the tape path in a third direction and an opposing fourth direction, the tape head comprising:
a first head module, comprising:
a write element capable of recording a data signal to the tape; and
a servo element capable of detecting a servo signal comprising the first recorded servo signal and the second recorded servo signal; and
a second head module positioned laterally adjacent to the first head module, comprising a read element positioned laterally opposite the write element on the first head module, the read element being capable of detecting the data signal on the tape;
a servo detector capable of communication with the servo element and with servo logic, wherein the servo detector provides servo signals comprising the ratio of the detected first recorded signal and the detected second recorded signal;
an independent position sensor providing an IPS signal comprising a measurement of the lateral position of the tape head with respect to the tape path;
a servo loop responsive to the IPS signal and capable of moving the tape head in the third direction and in the fourth direction;
a memory device;
logic capable of communicating with the servo detector, the memory device, the independent position sensor and the servo loop, the logic:
noise calibrating the tape system to generate first and second correlated noise factors;
directing the motion system to transport the data tape longitudinally across the tape head;

transmitting a data signal to the write element to be recorded on the tape, the data signal including noise;
receiving the transmitted data signal as a raw data signal, the raw data signal including the noise;
receiving a raw servo signal from the servo element, the raw servo signal including noise from the transmitted data signal;
separating the raw servo signal into the first and second servo signals at the first and second frequencies F1 and F2, respectively;
filtering the first and second servo signals to generate first and second filtered servo signals, respectively;
separating the data signal into first and second data signals at the frequencies F1 and F2, respectively;
filtering the first and second data signals to generate first and second filtered data signals, respectively;
applying the first and second correlated noise factors to the first and second filtered data signals, respectively, to generate first and second correlated noise values, respectively; and
subtracting the first and second noise values from the first and second filtered servo signals, respectively to generate first and second noise-compensated servo signals.

16. The tape system of claim 15, wherein the logic:
separates the raw servo signal into first and second servo signals by processing the raw servo signal through a first multi-tap bandpass filter; and
separates the data signal into first and second data signals by processing the data signal through a second multi-tap bandpass filter having the same characteristics as the first multi-tap bandpass filter.

17. The tape system of claim 15, wherein the logic:
filters the first and second servo signals by processing the first and second servo signals through first and second second-order bandpass filters, respectively; and
filters the first and second data signals by processing the first and second data signals through third and fourth second-order bandpass filters, respectively, having the same characteristics as the first and second second-order bandpass filters, respectively.

18. The tape system of claim 17, wherein the logic noise calibrates the same-gap, frequency-based servo tape system by:
determining the first correlated noise factor as a ratio of the magnitude of the first filtered servo signal to the magnitude of the first data signal; and
determining the second correlated noise factor as a ratio of the magnitude of the second filtered servo signal to the magnitude of the second data signal.

19. The tape system of claim 15, wherein the logic:
filters the first and second servo signals by processing the first and second servo signals through first and second Goertzel bandpass filters, respectively; and
filters the first and second data signals by processing the first and second data signals through third and fourth Goertzel bandpass filters, respectively, having the same characteristics as the first and second Goertzel bandpass filters, respectively;
wherein:
the output of the first Goertzel bandpass filter comprises a real component and an imaginary component representing a magnitude and phase, respectively, of the first filtered servo signal at frequency F1;
the output of the second Goertzel bandpass filter comprises a real component and an imaginary component representing a magnitude and phase, respectively, of the second filtered servo signal at frequency F2;
the output of the third Goertzel bandpass filter comprises a real component and an imaginary component representing a magnitude and phase, respectively, of the first filtered data signal at frequency F1; and
the output of the fourth Goertzel bandpass filter comprises a real component and an imaginary component representing a magnitude and phase, respectively, of the second filtered data signal at frequency F2.

20. The tape system of claim 19, wherein the logic further calibrates the same-gap, frequency-based servo tape system by generating third and fourth correlated noise factors.

21. The tape system of claim 20, wherein the logic noise calibrates the same-gap, frequency-based servo tape system by:
determining the first correlated noise factor as a ratio of the magnitude of the real component of the first filtered servo signal to the magnitude of the real component of the first data signal;
determining the second correlated noise factor as a ratio of the phase of the imaginary component of the first filtered servo signal to the phase of the imaginary component of the first data signal;
determining the third correlated noise factor as a ratio of the magnitude of the real component of the second filtered servo signal to the magnitude of the real component of the second data signal; and
determining the fourth correlated noise factor as a ratio of the phase of the imaginary component of the second filtered servo signal to the phase of the imaginary component of the second data signal.

22. Noise cancellation architecture for a frequency-based, same-gap servo tape system for reading/writing data from/to a magnetic tape, the tape having a plurality of laterally spaced data tracks extending longitudinally along the length of the tape and further having at least one servo track extending longitudinally along the length of the tape and positioned laterally between two data tracks, the servo track having a first servo signal recorded at a first frequency F1 on two outer servo bands and a recorded second servo signal at a second frequency F2 on an inner servo band, the architecture comprising:
a first multi-tap bandpass filter for separating a raw servo signal into first and second servo signals;
a second multi-tap bandpass filter having the same characteristics as the first multi-tap bandpass filter for separating a raw data signal into first and second data signals;
first and second Goertzel bandpass filters for filtering the first and second data signals, respectively;
third and fourth Goertzel bandpass filters having the same characteristics as the first and second Goertzel bandpass filters, respectively, for filtering the first and second servo signals, respectively;
wherein:
the output of the first Goertzel bandpass filter comprises a real component and an imaginary component representing a magnitude and phase, respectively, of the first filtered data signal at frequency F1;
the output of the second Goertzel bandpass filter comprises a real component and an imaginary component representing a magnitude and phase, respectively, of the second filtered data signal at frequency F2;
the output of the third Goertzel bandpass filter comprises a real component and an imaginary component representing a magnitude and phase, respectively, of the first filtered servo signal at frequency F1; and the output of the fourth Goertzel bandpass filter comprises a real component and an imaginary component representing a magnitude and phase, respectively, of the second filtered servo signal at frequency F2;

a first multiplier for applying a first correlated noise factor to the real component of the output of the first Goertzel bandpass filter to generate a first gain factor;

a second multiplier for applying a second correlated noise factor to the imaginary component of the output of the first Goertzel bandpass filter to generate a second gain factor;

a third multiplier for applying a third correlated noise factor to the real component of the output of the second Goertzel bandpass filter to generate a third gain factor;

a fourth multiplier for applying a fourth correlated noise factor to the imaginary component of the output of the second Goertzel bandpass filter to generate a fourth gain factor;

a first adder for applying the first gain factor to the real component of the output of the third Goertzel bandpass filter to generate a first noise-compensated servo signal;

a second adder for applying the second gain factor to the imaginary component of the output of the third Goertzel bandpass filter to generate a second noise-compensated servo signal;

a third adder for applying the third gain factor to the real component of the output of the fourth Goertzel bandpass filter to generate a third noise-compensated servo signal; and a fourth adder for applying the fourth gain factor to the imaginary component of the output of the fourth Goertzel bandpass filter to generate a fourth noise-compensated servo signal.

* * * * *